Patented Dec. 30, 1947

2,433,391

UNITED STATES PATENT OFFICE 2,433,391

DICYANDIAMIDE OXALATES

Joseph H. Paden and Alexander F. MacLean, Stamford, Conn., assignors to American Cyanamid Company, New York, N. Y., a corporation of Maine No Drawing. Application October 25, 1945, Serial No. 624,578

4 Claims. (Cl. 260—501)

This invention relates to the oxalate salts of dicyandiamide and to methods of preparing the same.

It has been recorded in the literature that dicyandiamide, a neutral compound having a low ionization constant would not form salts with acids in aqueous solutions. In spite of this argument which refutes the formation of such salts it has now been discovered that oxalate salts of dicyandiamide can be prepared.

The oxalate salts are prepared by reacting dicyandiamide with oxalic acid in a solvent for either or both of the reactants such as ethers, esters, ketones, acids and the like.

The following example will serve to illustrate the preparation of an oxalate salt of dicyandiamide:

EXAMPLE

*Preparation of didicyandiamide oxalate*

| Reactants | Molar Ratio |
|---|---|
| Dicyandiamide | 1.0 |
| Oxalic acid | 1.0 |
| Acetone | 10.4 |

The dicyandiamide is slowly added to the acetone solution of oxalic acid and the reaction becomes endothermic. A clear solution is not obtained, but as the oxalate salt of dicyandiamide crystallizes, the unreacted dicyandiamide dissolves in the acetone. After the dicyandiamide reacts completely, the colorless crystals of didicyandiamide oxalate are filtered, washed with fresh acetone and dried under vacuum at 40° C. By means of a potentiometric titration, the molecular weight was found to agree closely with the theoretical value of 258.

Didicyandiamide oxalate does not have a sharp melting or decomposition point, but since analytical data checks the theoretical composition, the optical and crystallographic properties are presented herein in order to characterize the oxalate. Didicyandiamide oxalate is a white, lamellar crystalline solid which has a positive optic sign. The apparent optic axial angle as observed in air is 41° and the true optic axial angle calculated therefrom is 29°. In white light the refractive index, $\beta$, is 1.541. The optic axial plane or principal optic section is perpendicular to the face of the plate-like crystal which is presented for observation. Three silhouette angles of the face presented are 97°±30′, 138°±30′, and 131°±30′. The principal vibration direction for $\beta$ is at an angle of 6°±30′ to the elongation of the crystal.

The oxalate salts of dicyandiamide are useful as chemical intermediates in the preparation of flame proofing compositions, chemotherapeutic agents, insecticides, synthetic resins and for other purposes.

While the invention has been described with particular reference to specific embodiments, it is to be understood that it is not to be limited thereto, but is to be construed broadly and restricted solely by the scope of the appended claims.

What is claimed:

1. Didicyandiamide oxalate.

2. A method of preparing didicyandiamide oxalate which includes the steps of reacting dicyandiamide with oxalic acid below substantially 50° C.

3. A method of preparing didicyandiamide oxalate which includes the steps of reacting dicyandiamide with oxalic acid in an organic solvent for the dicyandiamide and the oxalic acid below substantially 50° C.

4. A method of preparing didicyandiamide oxalate which includes the steps of reacting in acetone dicyandiamide with oxalic acid in a molar ratio of substantially 1:1 below substantially 50° C., and recovering the didicyandiamide oxalate therefrom.

JOSEPH H. PADEN.
ALEXANDER F. MacLEAN.

REFERENCES CITED

The following references are of record in the file of this patent:

UNITED STATES PATENTS

| Number | Name | Date |
|---|---|---|
| 1,939,365 | Piccard | Dec. 12, 1933 |
| 2,131,127 | Ter Horst | Sept. 27, 1938 |
| 2,223,935 | Daniels et al. | Dec. 3, 1940 |
| 2,265,942 | Hill | Dec. 9, 1941 |
| 2,323,869 | Jayne et al. | July 6, 1943 |
| 2,364,594 | Thurston et al. | Dec. 5, 1944 |

FOREIGN PATENTS

| Number | Country | Date |
|---|---|---|
| 332,681 | Germany | Jan. 27, 1921 |

OTHER REFERENCES

Hoag Liebigs Annalen, vol. 122, pp. 29 and 30 (1862).

Davis, Jour. Am. Chem. Soc., vol. 43, pp. 2232–2233, 1921.

Davis, Jour. Am. Chem. Soc., vol. 43, p. 669, 1921.